United States Patent
Goodwin, III et al.

(10) Patent No.: US 8,566,452 B1
(45) Date of Patent: Oct. 22, 2013

(54) INTELLIGENT HTTP BASED LOAD-BALANCING, PERSISTENCE, AND APPLICATION TRAFFIC MANAGEMENT OF SSL VPN TUNNELS

(75) Inventors: James S. Goodwin, III, San Jose, CA (US); Amit Jain, San Jose, CA (US); Ravi Natarajan, Milpitas, CA (US)

(73) Assignee: F5 Networks, Inc., Seattle, WA (US)

( * ) Notice: Subject to any disclaimer, the term of this patent is extended or adjusted under 35 U.S.C. 154(b) by 897 days.

(21) Appl. No.: 11/831,719

(22) Filed: Jul. 31, 2007

Related U.S. Application Data (60) Provisional application No. 60/821,380, filed on Aug. 3, 2006.

(51) Int. Cl.
*G06F 15/16* (2006.01)

(52) U.S. Cl.
USPC .......................................... 709/227; 709/228

(58) Field of Classification Search
USPC .................................. 709/227, 228
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,965,772 A | 10/1990 | Daniel et al. |
| 5,023,826 A | 6/1991 | Patel |
| 5,053,953 A | 10/1991 | Patel |
| 5,166,931 A | 11/1992 | Riddle |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |

(Continued)

FOREIGN PATENT DOCUMENTS

| | | |
|---|---|---|
| EP | 0 744 850 | 11/1996 |
| WO | WO-91/14326 | 9/1991 |

(Continued)

OTHER PUBLICATIONS

Gourley et al, HTTP: The Definitive Guide; Date: Sep. 27, 2002, Publisher: O'Reilly Media, Inc. Pub. Print ISBN-13: 978-1-56592-509-0, pp. 91-92 and 153-154.*

(Continued)

*Primary Examiner* — Harunur Rashid
(74) *Attorney, Agent, or Firm* — Frommer Lawrence & Haug LLP; Jamie L. Wiegand

(57) ABSTRACT

A system, apparatus, and method are directed to converting from a use of a HTTPS connection to a tunnel connection while maintaining an underlying connection between a client and a server. An HTTPS connection is employed to establish a network connection between a client device and a network device. A gateway is selected to receive a request from the client device. In one embodiment, selecting may comprise using load-balancing, cookie-persistence, or the like. Subsequently, the HTTPS connection is transitioned to another application layer communication protocol connection. Transitioning may comprise converting from a use of a first protocol stack configured to process a HTTP connection to a second protocol stack configured to process a non-HTTP based application protocol connection, and establishing a tunnel between the client device and a server through the selected gateway.

18 Claims, 6 Drawing Sheets

(56) References Cited

U.S. PATENT DOCUMENTS

| | | | |
|---|---|---|---|
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,826,242 A | 10/1998 | Montulli |
| 5,835,724 A | 11/1998 | Smith |
| 5,848,412 A | 12/1998 | Rowland et al. |
| 5,862,325 A | 1/1999 | Reed et al. |
| 5,867,495 A | 2/1999 | Elliott et al. |
| 5,875,296 A | 2/1999 | Shi et al. |
| 5,892,914 A | 4/1999 | Pitts |
| 5,919,247 A | 7/1999 | Van Hoff et al. |
| 5,936,939 A | 8/1999 | Des Jardins et al. |
| 5,946,690 A | 8/1999 | Pitts |
| 5,949,885 A | 9/1999 | Leighton |
| 5,959,990 A | 9/1999 | Frantz et al. |
| 5,961,606 A | 10/1999 | Talluri et al. |
| 5,963,915 A | 10/1999 | Kirsch |
| 5,974,460 A | 10/1999 | Maddalozzo, Jr. et al. |
| 5,983,281 A | 11/1999 | Ogle et al. |
| 5,991,878 A | 11/1999 | McDonough et al. |
| 6,006,259 A | 12/1999 | Adelman et al. |
| 6,006,260 A | 12/1999 | Barrick, Jr. et al. |
| 6,006,264 A | 12/1999 | Colby et al. |
| 6,014,710 A | 1/2000 | Talluri et al. |
| 6,026,452 A | 2/2000 | Pitts |
| 6,028,857 A | 2/2000 | Poor |
| 6,041,357 A | 3/2000 | Kunzelman et al. |
| 6,047,268 A | 4/2000 | Bartoli et al. |
| 6,051,169 A | 4/2000 | Brown et al. |
| 6,076,108 A | 6/2000 | Courts et al. |
| 6,078,956 A | 6/2000 | Bryant et al. |
| 6,081,900 A * | 6/2000 | Subramaniam et al. | 726/19 |
| 6,085,234 A | 7/2000 | Pitts et al. |
| 6,088,717 A | 7/2000 | Reed et al. |
| 6,092,196 A | 7/2000 | Reiche |
| 6,098,093 A | 8/2000 | Bayeh et al. |
| 6,101,482 A | 8/2000 | DiAngelo et al. |
| 6,108,703 A | 8/2000 | Leighton et al. |
| 6,111,876 A | 8/2000 | Frantz et al. |
| 6,134,592 A | 10/2000 | Montulli |
| 6,138,142 A | 10/2000 | Linsk |
| 6,138,152 A * | 10/2000 | Jalote et al. | 709/219 |
| 6,161,139 A | 12/2000 | Win et al. |
| 6,163,806 A | 12/2000 | Viswanathan et al. |
| 6,167,453 A * | 12/2000 | Becker et al. | 709/245 |
| 6,170,017 B1 | 1/2001 | Dias et al. |
| 6,182,142 B1 | 1/2001 | Win et al. |
| 6,185,567 B1 | 2/2001 | Ratnaraj et al. |
| 6,185,598 B1 | 2/2001 | Farber et al. |
| 6,209,038 B1 | 3/2001 | Bowen et al. |
| 6,212,565 B1 | 4/2001 | Gupta |
| 6,225,995 B1 | 5/2001 | Jacobs et al. |
| 6,226,750 B1 | 5/2001 | Trieger |
| 6,247,050 B1 | 6/2001 | Tso et al. |
| 6,247,056 B1 | 6/2001 | Chou et al. |
| 6,253,230 B1 | 6/2001 | Couland et al. |
| 6,266,335 B1 | 7/2001 | Bhaskaran |
| 6,272,523 B1 | 8/2001 | Factor |
| 6,279,001 B1 | 8/2001 | DeBettencourt et al. |
| 6,327,609 B1 | 12/2001 | Ludewig et al. |
| 6,330,566 B1 | 12/2001 | Durham |
| 6,334,114 B1 | 12/2001 | Jacobs et al. |
| 6,345,288 B1 | 2/2002 | Reed et al. |
| 6,345,303 B1 | 2/2002 | Knauerhase et al. |
| 6,351,775 B1 | 2/2002 | Yu |
| 6,360,270 B1 | 3/2002 | Cherkasova et al. |
| 6,374,300 B2 | 4/2002 | Masters |
| 6,374,359 B1 | 4/2002 | Shrader et al. |
| 6,385,642 B1 | 5/2002 | Chlan et al. |
| 6,389,462 B1 | 5/2002 | Cohen et al. |
| 6,397,253 B1 | 5/2002 | Quinlan et al. |
| 6,415,322 B1 | 7/2002 | Jaye |
| 6,421,768 B1 | 7/2002 | Purpura |
| 6,424,992 B2 | 7/2002 | Devarakonda et al. |
| 6,430,618 B1 | 8/2002 | Karger et al. |
| 6,438,597 B1 | 8/2002 | Mosberger et al. |
| 6,446,117 B1 | 9/2002 | Gebauer et al. |
| 6,453,353 B1 | 9/2002 | Win et al. |
| 6,460,071 B1 | 10/2002 | Hoffman |
| 6,460,079 B1 | 10/2002 | Blumenau |
| 6,470,389 B1 | 10/2002 | Chung et al. |
| 6,473,802 B2 | 10/2002 | Masters |
| 6,490,624 B1 | 12/2002 | Sampson et al. |
| 6,510,464 B1 | 1/2003 | Grantges, Jr. et al. |
| 6,526,566 B1 * | 2/2003 | Austin | 717/109 |
| 6,557,038 B1 | 4/2003 | Becker et al. |
| 6,587,959 B1 | 7/2003 | Sjolander et al. |
| 6,594,260 B1 | 7/2003 | Aviani, Jr. et al. |
| 6,594,692 B1 | 7/2003 | Reisman |
| 6,732,269 B1 * | 5/2004 | Baskey et al. | 713/153 |
| 6,970,933 B1 | 11/2005 | Masters |
| 7,047,301 B2 | 5/2006 | Skene et al. |
| 7,430,755 B1 * | 9/2008 | Hughes et al. | 726/3 |
| 8,009,566 B2 | 8/2011 | Zuk et al. |
| 2002/0007413 A1 | 1/2002 | Garcia-Luna-Aceves et al. |
| 2002/0099826 A1 * | 7/2002 | Summers et al. | 709/227 |
| 2002/0156901 A1 * | 10/2002 | Erickson et al. | 709/227 |
| 2005/0076126 A1 * | 4/2005 | Knight et al. | 709/227 |
| 2005/0108156 A1 * | 5/2005 | Sumino et al. | 705/40 |
| 2008/0253366 A1 | 10/2008 | Zuk et al. |

FOREIGN PATENT DOCUMENTS

| | | |
|---|---|---|
| WO | WO-95/05712 | 2/1995 |
| WO | WO-97/09805 | 3/1997 |
| WO | WO-97/45800 | 12/1997 |
| WO | WO-99/05829 | 2/1999 |
| WO | WO-99/06913 | 2/1999 |
| WO | WO-99/10858 | 3/1999 |
| WO | WO-99/39373 | 8/1999 |
| WO | WO-99/64967 | 12/1999 |
| WO | WO-00/04422 | 1/2000 |
| WO | WO-00/04458 | 1/2000 |
| WO | WO-01/69890 | 9/2001 |

OTHER PUBLICATIONS

"A Process for Selective Routing of Servlet Content to Transcoding Modules," Research Disclosure 422124, IBM Corporation, pp. 889-890, Jun. 1999.

"AC200 and AC300—Release 2.0 Bandwidth Management Solutions," Allot Communications, Inc., Nov. 6, 1998 , 5 pp.

"Adding Scalability and Availability to TCP/IP Services," Coyote Point Systems, Inc., Sunnyvale, California, 1998, 4 pp.

"Balancing User-Request Loads," Chapter 13, Netscape Communications Corp., 1999, 10 pp.

"Be Free Handles a Billion Online Impressions Per Quarter with Coyote Point's Equalizer Load Balancer," Coyote Systems, Inc., 2003, 4 pp.

"Choosing the Right SSL Acceleration Device for Your E-Business," F5 Networks, 2003, 10 pp.

"Coyote Point's Adaptive Load Balancer, the Equalizer, to Work in Tandem with Bright Tiger's ClusterCATS Web Site Resource Management Software," Coyote Point Systems, Jan. 4, 1999, 3 pp.

"Creating and Managing User Sessions," 1999, Netscape Communications Corp., 5 pp.

"Distributed Traffic Management," Central Dispatch Data Sheet, Resonate, Inc., 1999, 2 pp.

"Equalizer," Coyote Point Systems, Inc., publication unknown, 2003, 2 pp.

"Getting Started," IBM WebSphere Performance Pack for Multiplatforms, Version 3.0, International Business Machines Corporation, Aug. 1999, 107 pp.

(56) References Cited

OTHER PUBLICATIONS

"IBM WebSphere Application Server Version 3.0.2.2 Release Notes," Updated Dec. 8, 2000, 33 pp.
"Maximum Performance with Fine-Grained Control: A Requirement for E-Business Applications and Services," Whitepaper, Resonate, Inc., Aug. 1999, 10 pp.
"Networkers," Cisco Systems, Inc., 2001, 47pp.
"Persistent Client State HTTP Cookies," Netscape Communications Corp., 1999, 5 pp.
"Proposals for Gathering Consumer Demographics," publication unknown, Oct. 1995, 5 pp.
"Resonate Introduces Resonate Dispatch, A Distributed Server Management Solution for Multi-Server Internet/Intranet Sites," News Release by Resonate, Inc., Dec. 9, 1996, 3 pp.
"Review Guide," IBM WebSphere Performance Pack for Multiplatforms, Version 2.0, International Business Machines Corporation, Mar. 1999, 32 pp.
"Servlet/Applet/HTML Authentication Process With Single Sign-On," Research Disclosure 429128, IBM Corporation, pp. 163-164, Jan. 2000.
"Sprint Introduces Global Internet VPN Service," A Daily Journal for Broadband Networking, ATM News, Inc., 1999, 3 pp.
"The Next Step in Server Load Balancing," Alteon Web Systems, Inc. San Jose, California, White Paper dated Nov. 1999, 15 pp.
Acuitive, Inc. Virtual Resource Management: Industry Update and Analysis, Research Report 00001, Mar. 2000, p. 37 and p. 47.
Acuitive, Inc. Virtual Resource Management: Industry Update and Analysis. Product Version 1.0, Mar. 2000, 47 Pages.
Acuitive, Inc. Virtual Resource Management: Which Vendor is Right for You? Product Version 3.0, Mar. 2000, 136 Pages.
Anderson, Paul and James, Gail. Performance Soars, Features Vary. Network World Fusion. Jun. 14, 1999, 5 Pages. www.nwfusion.com.
Arrowpoint Communications. A Comparative Analysis of Web Switcing Architectures. Jun. 2000. Abstract (2 Pages) and Article (12 Pages). www.knowware.co.uk.com.
Arrowpoint Communications. ArrowPoint and CUBE Technologies Team to Deliver 100% Uptime and E-Transaction Services . . . Business Wire. Apr. 12, 1999, 3 Pages, Westford, MA.
Arrowpoint Communications. ArrowPoint Communications Wins 1999 Hot Product Award from Data Communications Magazine. Press Release, Jan. 8, 1999, 1 Page, Westford, MA.
Arrowpoint Communications. ArrowPoint—When Web Performance is Your Business. Internetweek.com. Oct. 21, 1999 4 Pages. www.internetwk.com.
Arrowpoint Communications. Frequently Asked Questions (about ArrowPoint Communications). Feb. 14, 2003, 3 Pages. www.knoware.co.uk.com.
Babir, A. et al, "Known CN Request-Routing Mechanisms," Nortel Networks et al., Network Working Group, Internet Draft, Apr. 3, 2003, 22 pp.
Bizyayev, Slava, "Tutorials: Building a Large-Scale E-commerce site with Apache and moc_perl," publication unknown, Mar. 15, 2004, 106 pp.
Brooks, Roseann Mcgrath. Sapphire/Web: A Gem of an Integration Solution. ENT. May 20, 1998, 2 pp., vol. 9, No. 3.
Canover, Joel. ArrowPoint CSS-100 Switch: Layer-By-Layer Load-Balancing. Nov. 11, 2002. 3 Pages. www.networkcomputing.com.
Cardellini, Valeria et al., "Dynamic Load Balancing on Web-server Systems," IEEE Internet Computing, IEEE, vol. 3, No. 3, 1999, 24 pp.
Cardellini, Valeria et al., "The State of the Art in Locally Distributed Web-Server Systems," ACM Computing Surveys, vol. 34, No. 2, Jun. 2002, 49 pp.
Caruso, Jeff, "Vendors up load -balancing ante," Network World, Inc., Nov. 15, 1999, 4 pp.
Caruso, Jeff. Cookies Are the Rage in Load-Balancing Switches. Network World Fusion. Jan. 26, 2000, pp. 3 of 6. www.nwfusion.com.
Caruso, Jeff. Foundry Extends Server Load-Balancing Reach. Network World Fusion. Jan. 17, 2000, pp. 2 of 6. www.nwfusion.com.
Caruso, Jeff. Resonate Sticks Its Hand in the 'Cookie' Jar. Network World Fusion. Dec. 6, 1999, pp. 2 of 5. www.nwfusion.com.
Cherkasova, Ludmilla, "FLEX: Design and Management Strategy for Scalable Web Hosting Service," Hewlett-Packard Company, 1999, 38 pp.
Chow, Edward, "Advanced Load Balancing/Web Systems," Department of Computer Science, University of Colorado at Colorado Springs, Jun. 21, 2000, 82 pp.
Chu, Chi, "IP Cluster," Research 2000, Inc., Aug. 1996, 7 pp.
CISCO. How ArrowPoint Cookies Function on the CSS 11000 Series in 4.x Code. Nov. 7, 2002. 9 Pages. www.cisco.com.
Damani, Om P. et al., "ONE-IP: techniques for hosting a service on a cluster of machines," Computer Networks and ISDN Systems 29 (1997), Elsevier Science B.V., 1997, pp. 1019-1027.
Eddy, Andy. ArrowPoint Targets Overloaded Server Farms. Network World. Apr. 13, 1998, 3 Pages. www.nwfusion.com.
Email from Josh Hildebrand to Rob Gilde, F5 Networks, dated Sep. 10, 1998, 3 pp.
Engelschall, Ralf S., "Load Balancing Your Web Site," Web Techniques Magazine, vol. 3, Issue 5, May 1998, 8 pp.
Fielding, R. et al., "RFC 2068, Hypertext Transfer Protocol—HTTP/1.1," Network Working Group, Request for Comments: 2068, Category: Standards Track, Internet RFC/STD/FYI/BCP Archives, Jan. 1997, 115 pp.
Gage, Christopher. SecureWay Network Dispatcher Version 2.1: Scaleability, Availability and Load-Balancing for TCP/IP Applications. IBM. Apr. 1999, 15 Pages, South Carolina.
Goldszmidt, G. et al., "NetDispatcher: A TCP Connection Router," IBM Research Report, IBM Research Division, Yorktown Heights, New York, May 19, 1997, 32 pp.
Goldszmidt, G., "Load Management for Scaling up Internet Services," IEEE, 1998, pp. 828-835.
Harbaugh, Logan G. Balancing the Load. Internetweek.com. Jan. 25, 1999, 9 Pages. www.internetwk.com.
Herringshaw, Chris, "Tuning Web Site Performance," excerpted from Network Magazine, Nov. 15, 1997, 3 pp.
IBM U.S. Announcement Letter. IBM WebSphere Performace Pack Delivers Quality Service with Enhanced Functions. Mar. 16, 1999, 13 Pages. www.ibmlink.ibm.com.
IBM. About IBM Network Dispatcher Features. Sep. 23, 2003. 4 Pages. mhtml: file://M:.backslash.'802%20patent%20(cookie%)persistence).backslash. Related%20art%20research.com.
IBM. User's Guide: SecureWay Network Dispatcher; Version 2.1 for AIX, Solaris, and Windows NT. Mar. 1999, 8 Pages.
Infoliberia, Inc. ArrowPoint and InfoLibria Announce Scalable Solution to Improve Web Performance and Availability. Press Release. Jun. 2, 1999. 3 Pages. Westford, MA.
Kristol, D. et al., "HTTP State Management Mechanism," Bell Laboratories et al., Network Working Group, Request for Comments: 2109, Category: Standards Track, Feb. 1997, 21 pp.
Kristol, David M., "HTTP Cookies: Standards, Privacy and Politics," Lucent Technologies, 2001, 49 pp.
Kristol, David M., "HTTP Proxy State Management Mechanism," Bell Laboratories, Lucent Technologies, HTTP Working Group, Internet Draft, May 26, 1998, 6 pp.
Kristol, David M., "Proposed HTTP State-Info Mechanism," AT&T Bell Laboratories, HTTP Working Group, Internet Draft Sep. 22, 1995, 8 pp.
Lavoie, B. et al., "Web Characterization Terminology & Definitions Sheet," W3C Working Draft, May 24, 1999, 12 pp.
Lin, Wei-Jyh and Chen, Kung. A Database Application Generator for the WWW. Journal of the Chinese Institute of Engineers. 1998. pp. 337-346. vol. 21, No. 3.
Lucent Technologies. Lucent Signs OEM Agreement for ArrowPoint Web Switches. Press Release. Apr. 26, 1999. 3 Pages. Westford, MA.
Mogul, Jeffrey C., "The Case for Persistent-Connection HTTP," SIGCOMM '95, Cambridge, Massachusetts, 1995, pp. 299-313.
Moore, Keith, "Applicability Statement for HTTP State Management," University of Tennessee, Network Working Group, Internet Draft, Nov. 18, 1998, 7 pp.

(56) References Cited

OTHER PUBLICATIONS

Network Applicance. Arrowpoint Communications and Network Applicance Team to Optimize Web Caches and Scaleability. Press Release. Nov. 16, 1998. 2 Pages. Westford, MA.
Network World Fusion. Response to Load-Balancing RFP: ArrowPoint. Jun. 13, 1999, 5 pp, www.nwfusion.com.
Pistoia, Marco and Letilley, Corinne. IBM WebSphere Performance Pack Load Balancing with IBM SecureWay Network Dispatcher, SG24-5858-00. Dec. 4, 2002. 1 Page abstract.
Pistoia, Marco and Letilley, Corinne. IBM WebSphere Performance Pack: Load Balancing with IBM SecureWay Network Dispatcher. 438 Pages. Oct. 1999. www.redbooks.ibm.com.
Riggs, Brian. Switchmakers Aim to Make Online Shopping Easier. Information Week Online. Nov. 15, 1999. 2 Pages. www.infomraitonweek.com.
Schemers, Roland J. III, "Ibnamed: A Load Balancing Name Server in Perl," 1995 LISA IX, Sep. 17-25, 1995, Montery, California, 11 pp.
Schroeder, Trevor et al, "Scalable Web Server Clustering Technologies,", IEEE Network, May/Jun. 2000, 8 pp.
Slide Presentation, First page titled, "Overview," HY359 (remainder of text not in English) May 4, 2004, 28 pp.
Srisuresh, P. et al., "Load Sharing using IP Network Address Translation (LSNAT)," Lucent Technologies et al., Network Working Group, Request for Comments: 2391, Category: Informational, Aug. 1998, 18 pp.
Taylor, Art. Java—Charging the Data Warehouse. Database Programming & Design. Oct. 1997. 58 Pages. vol. 10, No. 10.
Transcript of videotaped deposition of Daniel Matte, F5 Networks, Inc., Mar. 23, 2004, (pp. 77-88), 3 pp.
Transcript of videotaped deposition of Daniel Matte, F5 Networks, Inc., Apr. 22, 2004, (pp. 65-68), 1 pp.
Varma, Vik, "A Solution to Redundant, Load Balanced Firewall Systems," publication unknown, 1998, 6 pp.
Wu, Cheng. Web Switches Help Reduce Net Traffic. Network World. Mar. 29, 1999. 4 Pages. www.nwfusion.com.
Yang, Chu-Sing and Luo, Mon-Yen. Efficient Support for Content-Based Routing in Web Server Clusters. 2nd USENIX Symposium, 1999. pp. 221-232. Kaohsiung, Taiwan.
Zenel, Bruce, "A Proxy Based Filtering Mechanism for the Mobile Environment," Columbia University doctoral dissertation, 1998, 234 pp.
Zimmerman, Christine. Alteon Offers a Cookie-Cutter Approach to Load Balancing. InternetWeek.com. Nov. 8, 1999. 1 Page. www.internetwk.com.
See Internet Engineering Task Force, *Transmission Control Protocol*, http//IETF.org/html/rfc793 (accessed Dec. 28, 2007).
Hewitt, John R. et al., "Securities Practice and Electronic Technology," Corporate Securities Series, (New York: Law Journal Seminars-Press) 1998, title page, bibliography page, pp. 4.29-4.30.
Reardon, Marguerite, "A Smarter Session Switch: Arrowpoint's CS Session Switches Boast the Brains Needed for E-Commerce," Data Communications, Jan. 1999, title page, pp. 3, 5, 18.

\* cited by examiner

INTELLIGENT HTTP BASED LOAD-BALANCING, PERSISTENCE, AND APPLICATION TRAFFIC MANAGEMENT OF SSL VPN TUNNELS

CROSS-REFERENCE TO RELATED APPLICATIONS

This application claims the benefit of U.S. Provisional Application Ser. No. 60/821,380 entitled "Cookie Persistence For Load Balancing Of SSL/VPN Network Traffic Using HTTP Based Signaling For Tunnel Establishment," filed on Aug. 3, 2006, the benefit of the earlier filing date is hereby claimed under 35 U.S.C. §119 (e) and which is further incorporated herein by reference.

BACKGROUND OF THE INVENTION

The invention relates generally to remote network communications, and more particularly but not exclusively to employing an HTTPS connection to establish a network session between network devices and then transitioning to a non-HTTP based application protocol connection, while maintaining as active an underlying network session between the network devices.

The Internet's bandwidth continues to double every year. Some of this additional bandwidth is consumed, however, as new users access the Internet. Still additional bandwidth is consumed as existing users increase their use of the Internet. This increase of Internet use translates into an increase in traffic directed to and from various servers and through various networking components.

While some networking components are less costly they may still generally require a distribution mechanism to spread the workload so that each networking component performs work proportional to its capacity. Without proper placement and/or application of a networking component, eventually a network infrastructure may not be able to process its traffic in a timely manner.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, a "tunnel" or "tunneled connection" is a network mechanism that provides for the encapsulation of network packets or frames at a same or lower layer protocol of the Open Systems Interconnection (OSI) network stack. Tunneling may be employed to take packets or frames from one network system and place (or encapsulate) them inside of packets or frames from another network system. In one embodiment, tunneling may aggregate flows (example of a flow may include a sequence of packets with a same source/destination IP address and/or port number) between two network devices and transfer them as a single flow. Examples of tunneling protocols include, but are not limited to IP tunneling, L2TP, PPP, PPTP, VPNs, IPSec, GRE, MBone, SSL and TLS.

As used herein a "network connection" is a collection of links and/or software elements that enable a computing device to communicate with another computing device over a network. One such network connection may be a TCP connection. TCP connections are virtual connections between two network nodes, and are typically established through a TCP handshake protocol. The TCP protocol is described in more detail in RFC 793, which is available through the IETF, and which is further incorporated herein by reference. A network connection "over" a particular path or link refers to a network connection that employs the specified path or link to establish and/or maintain a communication.

As further used herein, the term SSL connection is directed towards secure virtual connections between network nodes that may be established using an SSL/TLS handshake protocol. An SSL connection may have a session ID associated with it that is used to identify an SSL session associated with the connection. An SSL connection can be terminated, and a new SSL connection established using the same session ID as the terminated connection. When this occurs, an SSL session that began with the first SSL connection may continue with a second SSL connection. Therefore, an SSL session can have one or more SSL connections associated with it. Moreover, an application running over an SSL connection may use the SSL session ID to identify and manage the session.

A version of the SSL protocol is described in Netscape Communications Corp, Secure Sockets Layer (SSL) version 3, (November 1996). The TLS protocol is derived from SSL, and is described in Dierks, T., and Allen, C., "The TLS Protocol Version 1.0," RFC 2246 (January 1999), available through the IETF, and is incorporated herein by reference. As used throughout this application, including the claims, SSL refers to SSL, TLS, and all secure communications protocols derived therefrom.

As used herein, the terms "protocol stack" or simply "stack" refers to any data structure comprising a plurality of layers, wherein each layer may manage, through the use of a network handler, at least one of the OSI layers. Network traffic may be managed by a lower layer in the stack, and results passed to a higher layer in the stack for further processing, or vice versa. The symbol "→" as used herein represents a transfer of a processed result from one handler/layer of the protocol stack to another handler/layer of the protocol stack.

Briefly stated, the invention is directed to transitioning from use of an HTTPS connection to a non-HTTP based application protocol connection while maintaining an underlying network session between a client device and a server. An HTTPS connection is employed to establish a network connection between a client device and a network device. A gateway is selected to receive a request from the client device. In one embodiment, the selection of the gateway may include using a load-balancing mechanism, cookie-persistence, or the like. Subsequently, the HTTPS connection is transitioned to another application layer communication protocol connection. Such transitioning may include replacing use of a first protocol stack configured to process a HTTP connection with a second protocol stack configured to process a non-HTTP based application protocol connection, and establishing a tunnel between the client device and the server through the selected gateway. Such transitioning is performed while maintaining as active, an underlying network session between the client device and the server.

In one embodiment, the invention is directed towards a system, apparatus, and method for performing SSL termination and Hyper Text Transfer Protocol (HTTP) based load-balancing using cookie persistence for SSL/VPN based network devices. The invention employs HTTP to establish an SSL/VPN tunnel to allow use of cookie persistence in load-balancing of SSL/VPN network traffic. Once the tunnel is established, the HTTP protocol may then be replaced with another non-HTTP based application protocol. In one embodiment, the other application layer protocol may include virtually any non-HTTP based application protocol, including, but not limited to telnet, Secure Shell (SSH), File Transfer Protocol (FTP), Point-to-Point Protocol (PPP), or the like.

Illustrative Operating Environment

Figure 1:
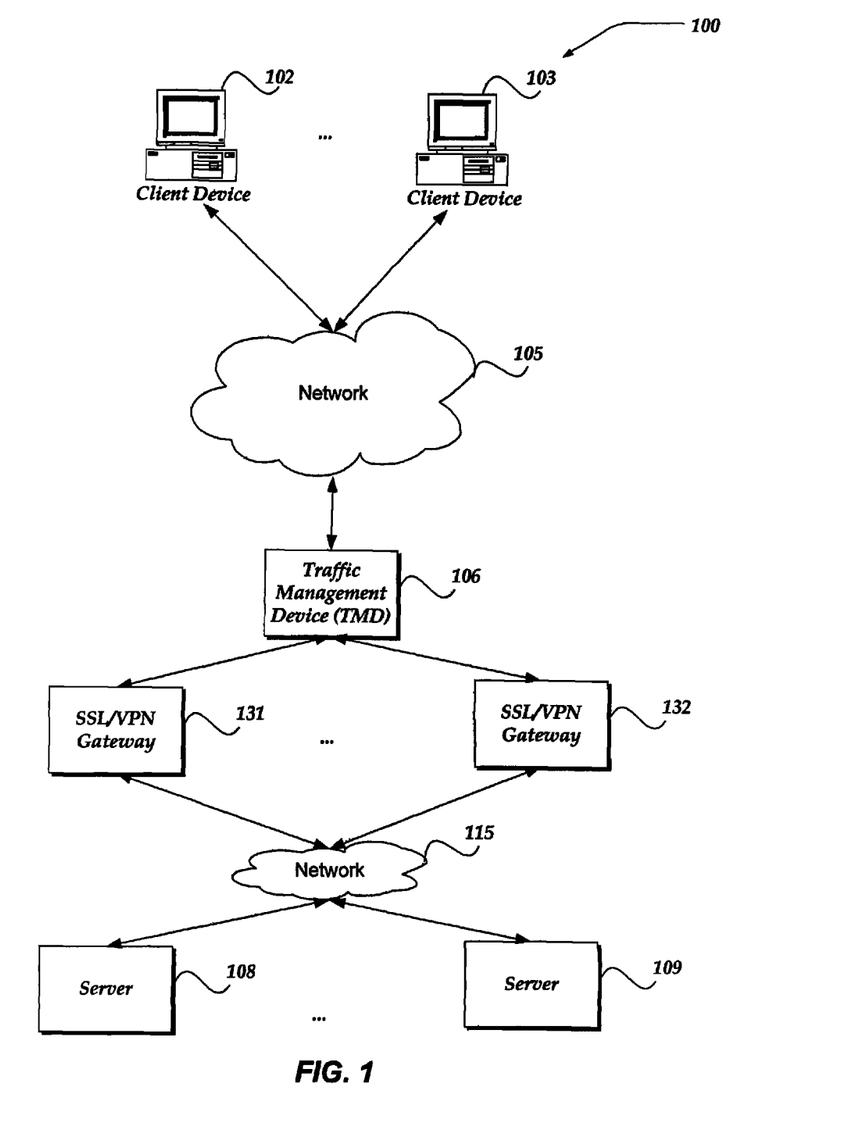
FIG. 1 shows a functional block diagram illustrating one embodiment of an environment for practicing the invention.

FIG. 1 illustrates an environment in which the invention may operate. However, not all of these components may be required to practice the invention, and variations in the arrangement and/or type of the components may be made without departing from the scope of the invention.

As shown, system 100 includes client devices 102-103, servers 108-109, networks 105 and 115, traffic management device (TMD) 106, and SSL/VPN gateways 131-132. Client devices 102-103 are in communication with TMD 106 through network 105. TMD 106 is in further communication with SSL/VPN gateways 131-132, while SSL/VPN gateways 131-132 are in communication with servers 108-109 through network 115.

Generally, client devices 102-103 may include virtually any computing device capable of connecting to another computing device for sending and/or receiving information over a network, such as network 105, or the like. Such devices may include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, or the like. Client devices 102-103 may also include other computing devices, such as personal computers, multi-processor systems, microprocessor-based or programmable consumer electronics, network devices, or the like. As such, client devices 102-103 may range widely in terms of capabilities and features. For example, a client device configured as a cell phone may have a numeric keypad and a few lines of monochrome LCD display on which text may be displayed.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol (WAP) messages, and/or wired application messages, or the like. In one embodiment, the browser application may be enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and/or the like, to display and send a message. Moreover, the browser application may be configured to communicate over network 105 using a secure connection where the content may be encrypted. Thus, in one embodiment, the browser application may be configured to employ various secure communication protocols including, but not limited to SSL, TLS, or the like, to establish a secure connection.

Client devices 102-103 also may include at least one client application that is configured to receive and/or to send content with another computing device. The client application may include a capability to provide and receive textual content, graphical content, audio content, alerts, messages, or the like. Moreover, client devices 102-103 may be further configured to communicate a message, such as through a Short Message Service (SMS), Multimedia Message Service (MMS), instant messaging (IM), internet relay chat (IRC), mIRC, Jabber, or the like, between another computing device, or the like. Client devices 102-103 may also be configured to receive and/or store an HTTP cookie based on data sent by the server with an HTTP/HTTPS header. Cookies are described in more detail in RFC 2109, which is incorporated herein by reference.

In one embodiment, client devices 102-103 may be configured such that an end-user may operate the computing device to make requests for data and/or services from other computers on the network. In one embodiment, client devices 102-103 may employ a network interface unit (sometimes called a transceiver), such as described below, to communicate information with another computing device. Often, the requested data resides in computing devices such as servers 108-109. In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa. In one embodiment, at least one of client devices 102-103 may be a computing device that is not operated by an end-user.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, or the like, to provide an infrastructure-oriented connection. Such sub-networks may include mesh networks, Wireless LAN (WLAN) networks, cellular networks, or the like. Network 105 may also include an autonomous system of terminals, gateways, routers, or the like connected by wireless radio links, or the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, or the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, or the like. In essence, network 105 includes any communication method by which information may travel between computing devices, such as client devices 102-103, TMD 106, or the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

Network 115 is configured to couple one computing device with another computing device. In one embodiment, however, network 115 may be secured behind a router, firewall, proxy device, network address translation device, gateway devices, or the like. As shown, network 115 couples SSL/VPN gateways 131-132 to servers 108-109.

One embodiment of TMD 106 is described in more detail below in conjunction with FIG. 2. Briefly, however, TMD 106 may include virtually any device that manages network traffic. Such devices include, for example, routers, proxies, firewalls, load balancers, cache devices, devices that perform network address translation, any combination of the preceding devices, or the like. TMD 106 may, for example, control the flow of data packets delivered to and/or forwarded from one or more servers, such as servers 108-109, or to one or more gateways, such as SSL/VPN gateways 131-132. TMD 106 may direct a request for a resource to a particular server based on network traffic, network topology, capacity of a server, content requested, and/or a host of other traffic distribution mechanisms. TMD 106 may receive data packets from and transmit data packets to the Internet, an intranet, or a local area network accessible through another network. TMD 106 may recognize packets that are part of the same communication, flow, and/or stream, and may perform special processing on such packets, including, for example, directing the packets to the same server so that state information may be maintained. TMD 106 also may support a wide variety of network applications, including, but not limited to web browsing, email, telephony, streaming multimedia and other traffic that may be sent in packets. One embodiment of operations performed by TMD 106 is described in more detail in conjunction with FIGS. 3 and 4.

TMD 106 may receive requests from one of client devices 102-103. TMD 106 may select a SSL/VPN gateway from SSL/VPN gateways 131-132 to forward the request. TMD 106 may employ any of a variety of criteria and/or mechanisms to select the gateway, including those mentioned above, load balancing mechanisms, or the like. TMD 106 is further configured to receive a response to the request and to forward the response to one of client devices 102-013 making the request. Moreover, TMD 106 may receive multiple requests in a pipeline from one or more of client devices 102-103. In which instance, TMD 106 may select multiple SSL/VPN gateways 131-132 to forward the requests. In one embodiment, each of the gateways may resolve to a single IP address. TMD 106 may also receive a response from servers 108-109, and/or SSL/VPN gateways 131-132, and provide the response to the requesting client device.

TMD 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, or the like. Such devices may be implemented solely in hardware or in hardware and software. For example, such devices may include application specific integrated circuits (ASICs) coupled to one or more microprocessors. The ASICs may be used to provide a high-speed switch fabric while the microprocessors may perform higher layer processing of packets. The BIG-IP® family of traffic managers, by F5 Networks of Seattle, Wash., is an example of TMDs.

Servers 108-109 may include any computing device capable of communicating packets with another computing device, for example, such as SSL/VPN 131-132, or the like, over a network. Each packet may convey a piece of information. A packet may be sent for handshaking, e.g., to establish a connection or to acknowledge receipt of data, for instance. In another instance, the packet may include information that may form a request, a response, or the like. Generally, packets received by servers 108-109 will be formatted according to TCP/IP, but they could also be formatted using other transport protocols, such as User Datagram Protocol (UDP), Internet Control Message Protocol (ICMP), NETbeui, IPX/SPX, token ring, or the like. Moreover, the packets may be communicated between servers 108-109, and another computing device, employing HyperText Transfer Protocol (HTTP), HTTP Secure (HTTPS), or the like. Moreover, servers 108-109 may include various applications or other resources that communicate using various application layer protocols other than HTTP, including, for example, telnet, Secure Shell (SSH), telnet, File Transfer Protocol (FTP), various emulation applications, or any of a variety of other non-HTTP based application protocols.

In one embodiment, servers 108-109 are configured to operate as a website server. However, servers 108-109 are not limited to web servers, and may also operate a messaging server, a File Transfer Protocol (FTP) server, a database server, content server, or the like. Additionally, servers 108-109 may be configured to perform different operations. Thus, for example, servers 108-109 may be configured as a messaging server, and a database server. Moreover, while servers 108-109 may operate as other than a website, they may still be enabled to receive an HTTP communication.

Devices that may operate as servers 108-109 includes personal computers, desktop computers, multiprocessor systems, microprocessor-based or programmable consumer electronics, network PCs, network appliances, or the like.

SSL/VPN gateways 131-132 include virtually any network device that may convert network traffic from one protocol or format to another protocol or format. As illustrated, SSL/VPN gateways 131-132 are configured to enable communications using SSL, and/or VPN traffic. However, the invention is not so limited, and other tunneling protocols may also be employed, without departing from the scope of the invention. Thus, SSL/VPN gateways 131-132, may include virtually any gateway device, router device, proxy device, or the like, without departing from the scope of the invention.

SSL/VPN gateways 131-132 may be configured to provide a list of networks (IP Subnets) to a user of client devices 102-103, which can be accessed remotely by the user. An IP subnet represents a division of a network into interconnected, but independent, segments, or domains, often to improve performance and/or security. The subnet may limit a number of nodes (e.g., client devices, servers, or the like) on the subnet to manage available bandwidth, manage quality of service (QoS), manage subnet loads, or the like. In one embodiment, a subnet may allow multiple users to access the Internet with a same subnet address. In one embodiment, a router may be used to traverse subnets.

SSL/VPN gateways 131-132 may further provide a log-in page, menu, screen, or the like, that may be used by the user to access at least one resource, service, or the like, available through servers 108-109. In addition, SSL/VPN gateways 131-132 may also be configured to provide a user with a menu, list, or the like of applications and/or services that may be available through servers 108-109, from which the user may select. SSL/VPN gateways 131-132 may also be configured to select one of servers 108-109 based in part on the user's selection, through a load-balancing mechanism, or the like.

SSL/VPN gateways 131-132 may be implemented within personal computers, desktop computers, multiprocessor systems, microprocessor-based or programmable consumer electronics, network PCs, network appliances, or the like.

Illustrative TMD Environment

Figure 2:
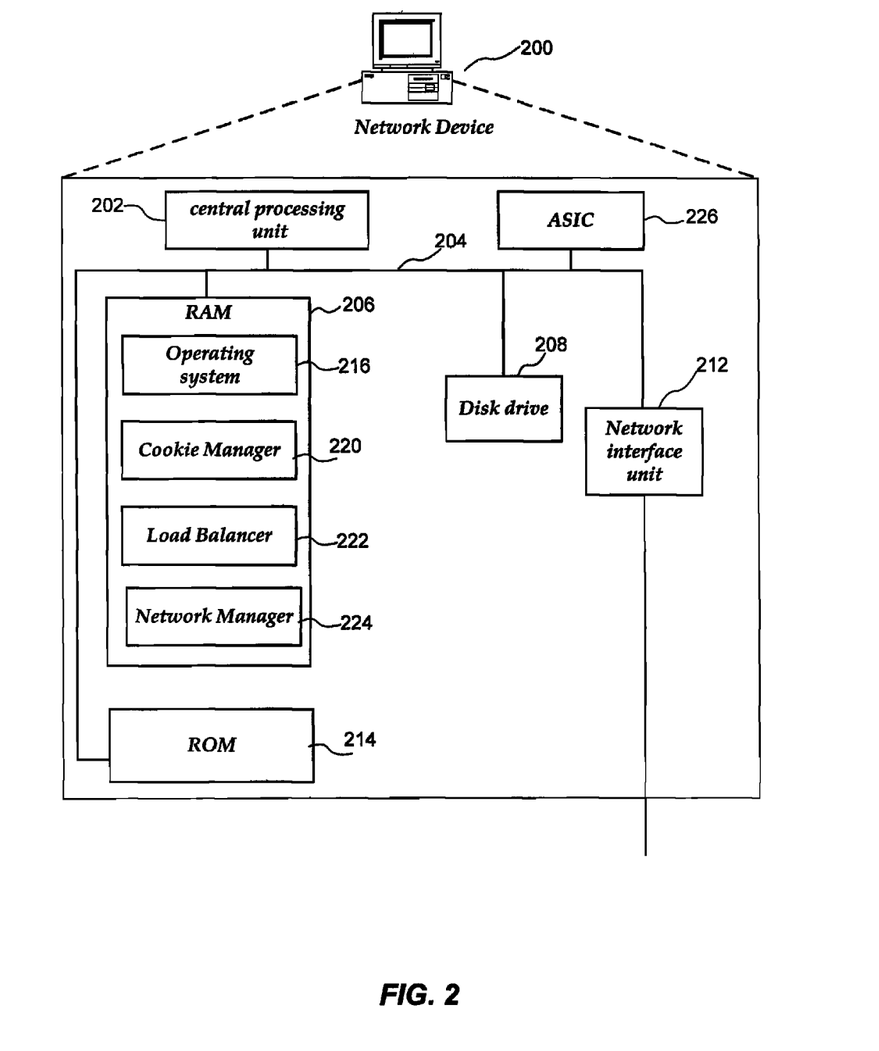
FIG. 2 shows one embodiment of a network device that may be included within the environment of FIG. 1.

FIG. 2 shows an exemplary network device 200 that may operate as TMD 106 of FIG. 1. It will be appreciated that not all components of network device 200 are illustrated, and that network device 200 may include more or less components than those shown in FIG. 2.

As illustrated in FIG. 2, network device 200 includes a central processing unit (CPU) 202, random Access Memory (RAM) 206, Read-Only Memory (ROM) 214, disk drive 208, and network interface unit 212, each of which are connected via bus 204. Network interface unit 212 is configured to enable network device 200 to communicate with various other computing devices. As such, network interface unit 212 includes the circuitry for connecting network device 200 to various networks, including network 105 of FIG. 1, or the like, and is constructed for use with various communication protocols including the TCP/IP and UDP/IP protocol. Network interface unit 212 may include or interface with circuitry and components for transmitting messages and data over a wired and/or wireless communications medium. Network interface unit 212 may be referred to as a transceiver, Network Interface Card (NIC), or the like.

In one embodiment, network device 200 may include one or more Application Specific Integrated Circuit (ASIC) chip 226 connected to bus 204. ASIC chip 226 can include logic that enables at least some of the actions of network device 200. For example, in one embodiment, ASIC chip 226 can be employed to perform packet processing functions on incoming and/or outgoing packets. In one embodiment, ASIC chip 226 may perform logic for cookie manager 220, load balancer 222, and/or network manager 224. In one embodiment, network device 200 includes one or more field-programmable gate arrays (FPGA) (not shown), instead of, or in addition to, ASIC chip 226. A number of other actions for the network device can be performed by ASIC chip 226, an FPGA, CPU 202 with instructions stored in memory, or any combination of actions performed by the ASIC chip, FPGA, and CPU.

Computer storage media may include volatile and nonvolatile, removable and non-removable media implemented in any method or technology for storage of information, such as computer readable instructions, data structures, program modules or other data. Examples of computer storage media include disk drive 208, RAM 206, ROM 214, EEPROM, flash memory, and/or any other memory architecture, CD-ROM, digital versatile disks (DVD) and/or any other optical storage, magnetic cassettes, magnetic tape, magnetic disk storage and/or any other magnetic storage devices, and/or any other medium that can store information that can be accessed by a computing device.

Network device 200 may also include an input/output interface (not shown) for communicating with external devices or users, including through a display device, keyboard, mouse interface, touch screen interface, stylus, audio inputs, or the like.

Network device 200 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, or the like. An application running on a blade may employ any of these interfaces to communicate information to other applications running on other blades and/or devices coupled to the blade server. Network device 200 can also be implemented as a combination of blades and additional components in the chassis.

Mass memory generally includes random access memory ("RAM") 206, read-only memory ("ROM") 214, and one or more permanent mass storage devices, such as hard disk drive 208. The mass memory stores operating system 216 for controlling the operation of network device 200. The operating system 216 may comprise an operating system such as UNIX, LINUX™, Windows™, or the like. In one embodiment, the mass memory may store program code and data for implementing cookie manager 220, load balancer 222, and network manager 224.

Cookie manager 220 is configured to manage network cookies, such as associations between cookies and devices, cookies and permissions, or the like. Cookie manager may request a creation of a cookie data structure from, for example, an HTTP server, an operating system component, or the like. The cookie data structure may be encrypted, in one embodiment. The cookie data structure may be sent within an application layer communication protocol (e.g., HTTP, HTTPS), for example, to a client device, client web browser, as part of a response to URL request, or the like. As part of future requests to network device 200, a client device may send the cookie within an application layer communication protocol. Cookie manager 220 may receive the cookie, identify the cookie, or otherwise manage the received cookie. A cookie/cookie data structure may be associated with an (unique) identifier, may be stored in a data store, table, or the like. Cookie manager 220 may store cookies in one of memory 206, disk drive 208, or the like. Cookie manager 220 may associate a cookie with a user, a user's permissions (e.g., validated to access a network resource, including an IP subnet, a device, or the like), a particular SSL/VPN gateway, or the like.

Load balancer 222 includes any component configured to receive a request for a service (e.g., a SSL/VPN gateway) and to select and to provide one of a plurality of services based on a plurality of load-balancing metrics, including network traffic, network topology, capacity of a server, content requested, a round-robin metric, a type of SSL/VPN service requested, including, for example, application tunnel, reverse proxy, network access, or the like.

Network manager 224 includes any component configured to manage a connection between devices, including forwarding messages, creating a tunnel, or the like. Network manager 224 may receive from cookie manager 220, an identity of a client device, user, permission, SSL/VPN gateway associated with a request, or the like. Network manager may receive a request for an establishment of a connection between client device and a network resource, through SSL/VPN. Network manager may forward the request to the cookie identified SSL/VPN gateway, to establish the connection, to establish a tunnel, or the like.

Generalized Operation

Figure 3A:
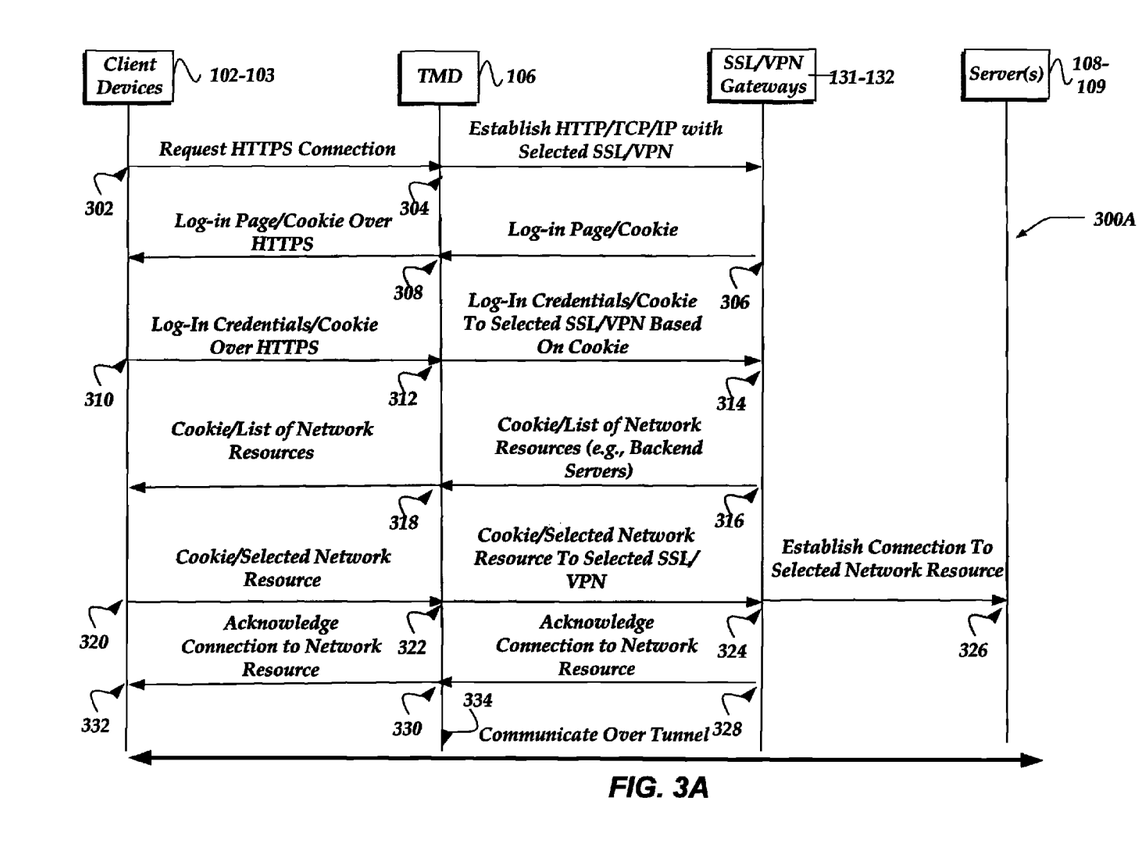
FIG. 3A illustrates a signal flow diagram generally showing one embodiment of a process useable in transitioning HTTPS traffic to non-HTTP based application protocol traffic.

The operation of certain aspects of the invention will now be described with respect to FIGS. 3A, 3B, 3C, and 4. FIG. 3A illustrates a signal flow diagram generally showing one embodiment of a process transitioning HTTPS traffic to non-HTTP based application protocol traffic, while maintaining an underlying network session communication active between the client device and the server, and/or SSL/VPN gateways.

Shown in FIG. 3A are client devices 102-103, TMD 106, SSL/VPN gateways 131-132, and servers 108-109 in communication with each other through the illustrated signal flows. Time is considered to flow downwards in FIG. 3A.

At step 302, one of client devices 102-103 may employ a browser, or other client application, to establish an HTTPS session with TMD 106. In one embodiment, the TMD 106 selects one of SSL/VPN gateways 131-132 using virtually any load balancing mechanism. In one embodiment, the client device communicates using a networking protocol stack that includes SSL and HTTP over TCP/IP. At step 304, TMD 106 may then communicate with the selected one of SSL/VPN gateways 131-132 using HTTP over TCP/IP. That is the, the established network session between TMD 106 and SSL/VPN gateways 131-132 might not employ an encryption protocol, such as SSL, TLS, or the like.

Next, at step 306, the selected one of SSL/VPN gateways 131-132 may return a log-in page to TMD 106. In one embodiment, the log-in page may enable a user to select and/or log into one of SSL/VPN gateways 131-132, and/or enable access to a resource, or the like, from servers 108-109. At step 308, TMD 106 may employ SSL to return the log-in page to the client device. In one embodiment, TMD 106 may generate a cookie that links the selected one of SSL/VPN gateways 131-132 to the client device. In one embodiment, the value in the cookie includes information that enables such linking.

In another embodiment, the selected one of SSL/VPN gateways 131-132 may generate the cookie, in which instance, TMD 106 may generate a table, spreadsheet, or other data mechanism that associates the selected one of SSL/VPN gateways 131-132 to the client device. In any event, at step 308, the cookie may then be provided to the client device in an HTTPS session.

Once the client device receives the log-in page, and the cookie, at step 310, the user may log in by providing a user's credentials (e.g., username, passwords, digital certificates, and/or any other form of credentials, such as a one time use passwords, or the like). At step 312, TMD 106 may receive the log-in data, along with the cookie, from the client device, and employ the cookie to determine which one of SSL/VPN gateways 131-132 to send the log-in data. Thus, in one embodiment, the cookie is employed to maintain persistence in the network connection between the client device and the selected load-balanced one of SSL/VPN gateways 131-132.

At step 314, the selected one of SSL/VPN gateways 131-132 may further establish a user session. Note, that in one embodiment, the selected one of SSL/VPN gateways 131-132 may further manage connections with a servers 108-109, or the like, wherein the servers 108-109 may be configured to provide a resource to a request from the client device.

In any event, at step 316, the selected one of SSL/VPN gateways 131-132 may have generated and/or sent a cookie to TMD 106 for use by the client device. The cookie may acknowledge that the client device has successfully signed in, and is valid. Thus, in one embodiment, selected one of SSL/VPN gateways 131-132 may expect to receive the cookie during communications with the client device, through TMD 106.

In one embodiment, upon a successful log-in by the user of the client device, at step 316, the selected one of SSL/VPN gateways 131-132 may provide a list of servers 108-109, applications, and/or networks (e.g. IP Subnets) which can be accessed remotely by the user by establishing SSL/VPN tunnels through the selected one of SSL/VPN gateways 131-132. The cookie/list may be provided through TMD 106, at step 318.

At step 320, the user of the client device may select at least one of the following: a TCP/IP application available through the servers 108-109, an IP network subnet, or employ at least one of resources provided in the list of resources. Selection from the list of resources may be provided to TMD 106 using HTTPS. In addition, in one embodiment, the client device may provide the cookie to TMD 106. At step 322, TMD 106 may employ the cookie to determine which one of SSL/VPN gateways 131-132 to send the selection request. TMD 106, then in turn may provide the request to the SSL/VPN gateway using HTTP over TCP/IP.

In addition, in one embodiment, the client device may provide an additional cookie, which, at step 322, TMD 106 may forward to SSL/VPN gateways 131-132. SSL/VPN gateways 131-132 may use the additional cookie for identifying a user's session.

In one embodiment, at step 324, SSL/VPN gateways 131-132 may process the selection request. SSL/VPN gateways 131-132 may then establish a connection with the selected network resource (e.g., one of servers 108-109) at step 326. At step 328, SSL/VPN gateways 131-132 send back its response to TMD 106 using HTTP over TCP/IP. At step 330, TMD 106, then in turn may forward to the client device over HTTPS.

In one embodiment, the selection request from the client device and response from SSL/VPN gateways 131-132 may mark the completion of tunnel establishment, signaling and triggering the tunnel establishment event, at step 332. Thus, an active underlying network session is established between one of servers 108-109 and one of client devices 102-103.

In one embodiment, at step 334, TMD 106 may employ a mechanism, such as iRules, which is described in more detail in U.S. patent application Ser. No. 11/258,551 entitled "Rule Based Extensible Authentication" to Hughes, et al., which is incorporated herein by reference, to disable HTTP with the client device; but, in one embodiment, the SSL session may remain. For example, an iRule such as HTTP::disable might be used to disable the HTTP protocol with the client. One embodiment of the HTTP::disable iRule is described in more detail F5, Networks, Inc.'s document entitled "Configuration Guide for Local Traffic Management," published January 2006, which is incorporated herein by reference.

In one embodiment, such events arise when the tunnel between the client device and TMD 106 is established (after a successful response from one of SSL/VPN gateways 131-132 to the initial selection request from client device). In one embodiment, SSL/VPN gateways 131-132 may also drop use of HTTP as an application layer protocol, and now employ the selected application layer protocol, including, for example, such as telnet, SSH, FTP, PPP, or other non-HTTP based application protocol. In another embodiment, any mechanism for SSL termination, other than iRules, may be used without departing from the scope of the invention. Such transition from one application layer protocol to another application layer protocol, however, is performed while maintaining as active the underlying network session communications. That is, in one embodiment, the underlying network session is not terminated during the transition of application layer protocols.

In one embodiment, the client device may transfer the selected application layer protocol data over the SSL connection between the client device and TMD 106. In one embodiment, TMD 106 may then forward the selected application layer protocol data to SSL/VPN gateways 131-132 over TCP/IP.

At step 334, the established association between the client device and at least one of SSL/VPN gateways 131-132 may be maintained for the duration of the SSL connection between the client device and TMD 106.

Figure 3B:
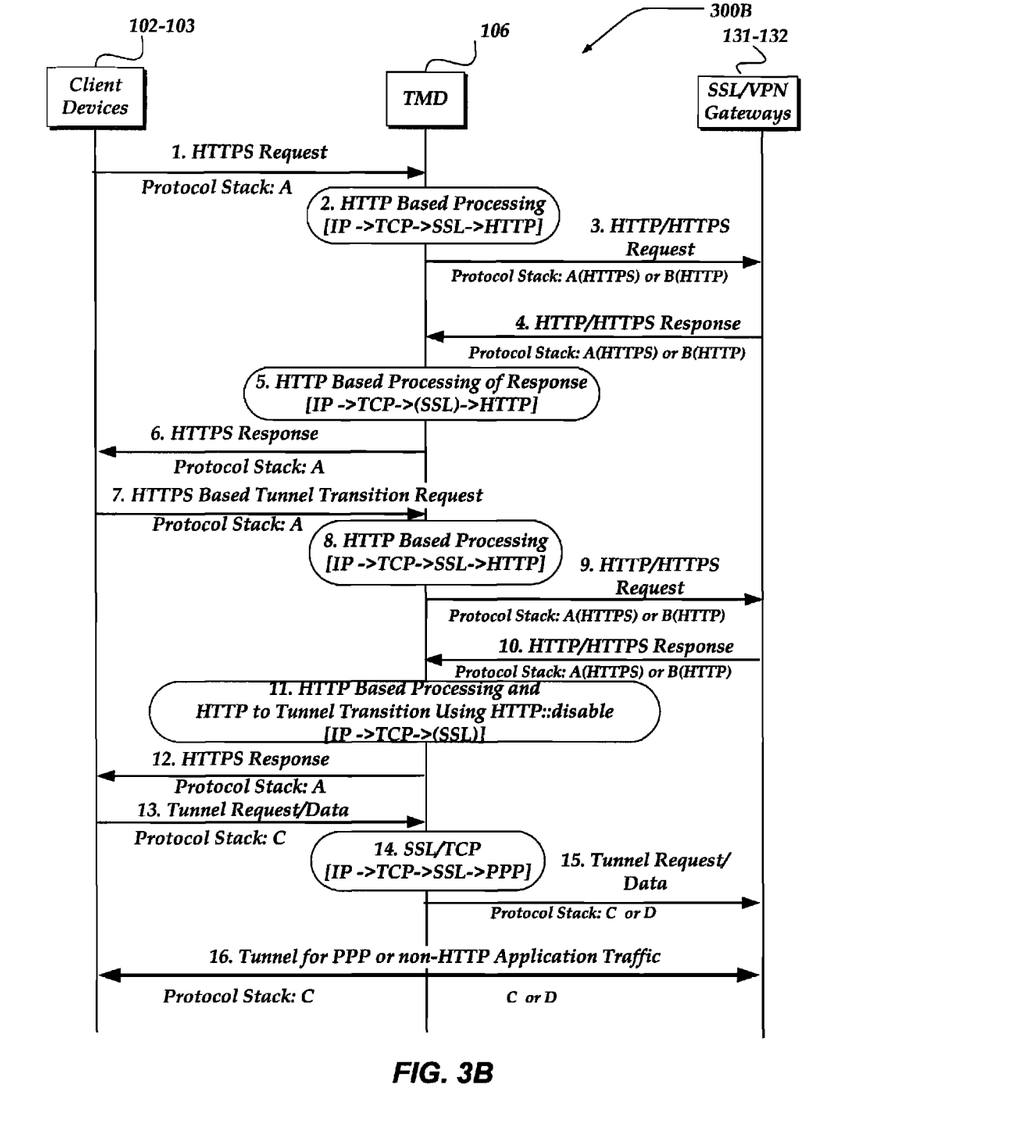
FIG. 3B illustrates a signal flow diagram generally showing one embodiment of a process for transitioning of connections from HTTP traffic to non-HTTP based application protocol traffic, while maintaining as active an underlying network session.

FIG. 3B illustrates a signal flow diagram generally showing one embodiment of a process for transitioning of connections from HTTP traffic to non-HTTP based application protocol traffic, while maintaining as active an underlying network session. Process 300B may begin after, for example, a user has successfully completed a login process to one of SSL/VPN 131-132 through TMD 106. For example, process 300B may begin after step 316 of FIG. 3A, where a web page provides available network resources to the user at one of client devices 102-103.

As shown, FIG. 3B illustrates signal flows between client devices 102-103, TMD 106, and SSL/VPN gateways 131-132. Moreover, as illustrated, time is considered to flow downwards in FIG. 3B.

At step 1, the user selects a particular network access resource, using one of client devices 102-103 the user sends an HTTPS request to TMD 106 for establishing an SSL/VPN connection. In one embodiment, the protocol stack used for this request may include stack A of FIG. 3C.

At step 2, after receiving the request, TMD 106 performs HTTP-based processing that comprises at least one of the following: 1) performing HTTP based load balancing, and/or cookie-based persistence, 2) if TMD 106 is configured to do SSL offloading, terminating the SSL protocol, and inserting the SSL parameters as HTTP headers for the HTTP request to be sent to at least one of the SSL/VPN gateways 131-132, and/or 3) performing a variety of other application analysis.

Figure 3C:
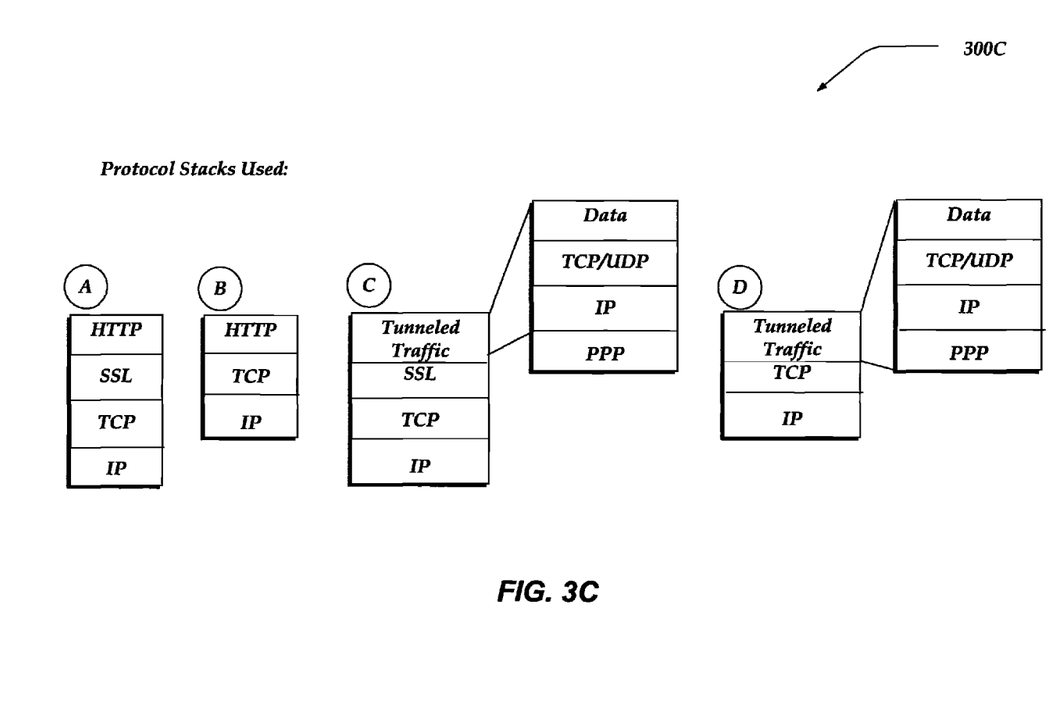
FIG. 3C illustrates one embodiment of various network protocol stacks useable during transitioning HTTPS traffic to non-HTTP based application protocol traffic.

At step 3, the connection request is sent to the selected SSL/VPN device using HTTP if the SSL is terminated by TMD 106 or HTTPS otherwise. In one embodiment, the protocol stack used for this connection is stack C of FIG. 3C, if SSL is not terminated by TMD 106. Otherwise stack D may be used. Although FIG. 3C illustrates the use of PPP for use in tunneling traffic, the invention is not so limited, and other tunneling protocols may also be employed, without departing from the scope of the invention.

At step 4, at least one of the SSL/VPN gateways 131-132 sends the connection parameters inside the HTTP(S) response as HTML entities, such as through the use of XML, attribute value pairs, or the like. At step 5, TMD 106 processes the HTTP response from one of SSL/VPN 131-132, for example, Cookie insertion, or the like. At step 6, TMD 106 sends the processed response to the user's browser at the requesting client device over SSL (e.g., HTTPS).

At step 7, upon receiving the connection parameters, the user browser at the requesting client device sends an HTTP-based Tunnel transition request to TMD 106. The tunnel transition request can be accomplished using, for example, a specific HTTP URI, a specific HTTP header field, or the like. At step 8, when the tunnel transition request is received at TMD 106, which then may perform HTTP-based processing as discussed above in step 2. At step 9, TMD 106 sends the request to the selected one of the SSL/VPN gateways 131-132.

At step 10, the selected one of the SSL/VPN gateways 131-132 sends the response with a specific HTTP status code back to TMD 106.

At step 11, TMD 106 processes the HTTP responses as discussed in step 5. For example, in one embodiment, TMD 106 may perform the HTTP(S) to non-HTTP based application protocol transition by disabling the HTTP processing using, for example, an "HTTP::disable" command. TMD 106 may also place HTTP traffic filtering into a pass through mode, change an invocation of protocol handlers: IP-handler→TCP-handler→SSL-handler, such as where HTTPS is used between TMD 106 and the selected one of the SSL/VPN gateways 131-132, using, for example, one of protocol stacks A or B of FIG. 3C.

At step 12, TMD 106 sends the HTTPS response to the user browser at one of client devices 102-103. After the HTTPS response is sent, since HTTP is disabled, TMD 106 will no longer perform HTTP-based processing for the connection.

At step 13, one of client devices 102-103 provides a non-HTTP based application protocol request to the selected one of the SSL/VPN gateways 131-132 on the same TCP connection that carried the tunnel conversion request. In one embodiment, the non-HTTP based application protocol may employ PPP; however, the invention is not so limited, and other tunneling protocols may also be employed. In any event, at step 14, where the HTTP is disabled, the invocation of protocol handlers for the connection includes IP→TCP→SSL→PPP. At step 15, the non-HTTP based application protocol request (processed, for example, by stack C or stack D of FIG. 3C) is sent to the selected one of the SSL/VPN gateways 131-132.

At step 16, the selected one of the SSL/VPN gateways 131-132 sends a non-HTTP based application protocol response/data back to TMD 106. The invocation of protocol handlers employed at TMD 106 may include, for example, IP→TCP→(SSL)→PPP, such as is illustrated by stacks C or D of FIG. 3C. At this time, HTTP handling for this connection is disabled. The response/data is sent back to the user at least one of client devices 102-103. Thus, step 16 establishes a dedicated PPP or other non-HTTP based application protocol between the at least one of client devices 102-103 and the selected one of servers 108-109 via the selected one of the SSL/VPN gateways 131-132.

FIG. 3C illustrates a stack transition process generally showing one embodiment of a process for HTTP(S) to tunnel conversion. Process 300C of FIG. 3C begins at stack A. As shown, stack A is configured to manage HTTPS traffic. Stack A processes network traffic using the following network protocol layers: IP→TCP→SSL→HTTP.

Stack B of FIG. 3C may be used where, for example, the network traffic is to be SSL terminated. As shown, stack B is configured to manage HTTP traffic. HTTP traffic from stack A may be sent to stack B, or may be pre-processed before being sent through stack B. Stack B may employ the following network protocol layers: IP→TCP→HTTP. In one embodiment, stack B may be optional, and the stack transition may instead proceed from stack A to stack C.

Stack C is configured to manage tunnel traffic over an SSL tunnel. As shown, stack C employs the following network protocol layers: IP→TCP→SSL→tunneled traffic. Tunneled traffic may be further processed in a stack that is configured to manage traffic using the following network protocol layers: PPP→IP→TCP or UDP→data, where data (not actually a protocol layer) may include virtually any data transmittable over a network. Based on the SSL encryption the data transmitted may be securely communicated.

Stack D is configured to terminate the SSL tunnel and transition to a non-SSL tunnel. As shown, stack C employs the following network protocol layers: IP→TCP→tunneled traffic. Tunneled traffic may be further processed in a stack using the following network protocol layers: PPP→IP→TCP or UDP→data (where data is not actually a protocol layer, per se). Tunneled traffic may be sent from stack C to stack D or may be pre-processed before being sent to stack D. In one embodiment, stack D may be optional, and network traffic may continue instead to be processed using stack C.

Figure 4:
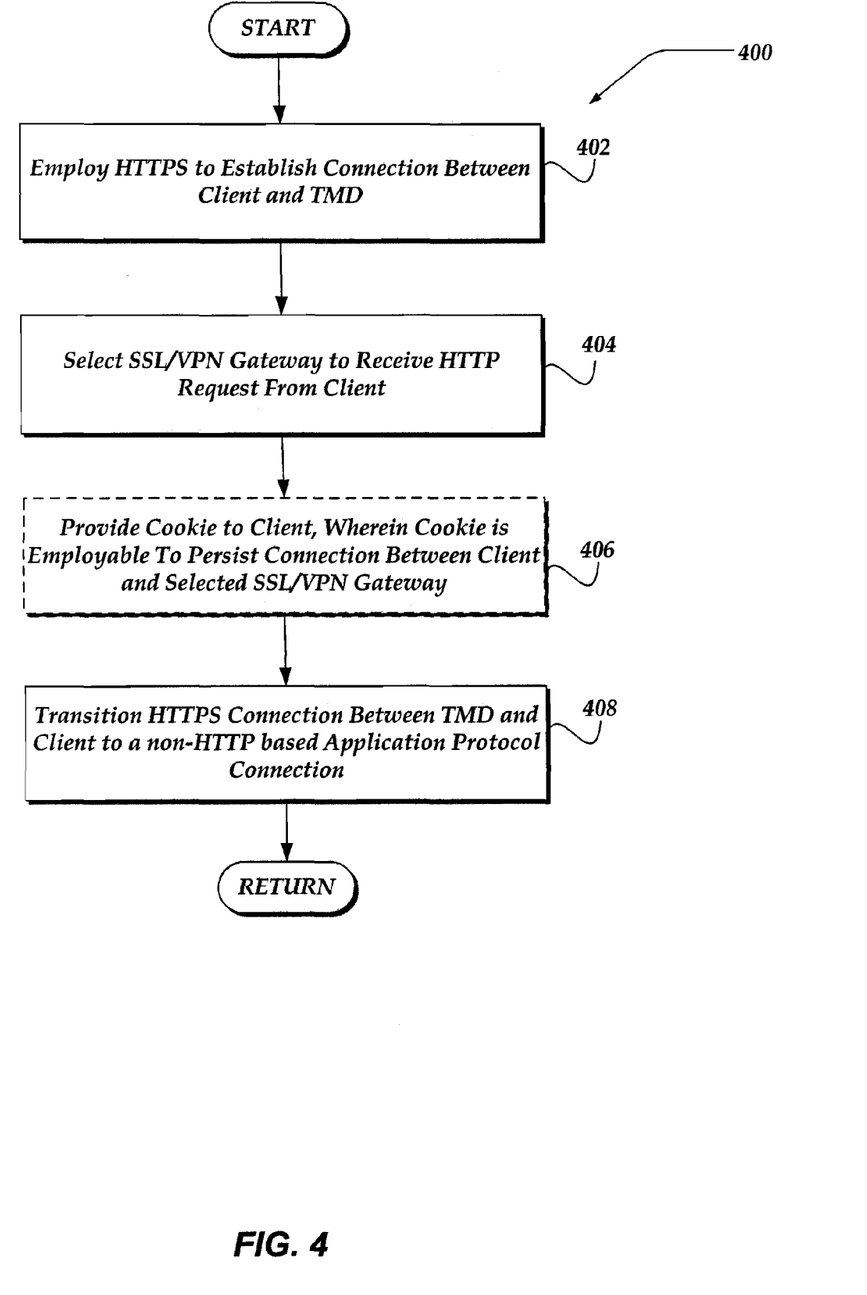
FIG. 4 illustrates a logical flow diagram generally showing one embodiment of a process for transitioning network traffic from use of HTTPS connection to use of non-HTTP based application protocol connection, in accordance with the present invention.

FIG. 4 illustrates a logical flow diagram generally showing one embodiment of a process for transitioning network traffic from use of HTTPS connection to use of non-HTTP based application protocol connection. Process 400 may be implemented, for example, within TMD 106 of FIG. 1.

Process 400 begins, after a start block, at block 402, where HTTPS is employed to establish a connection between a client device and a TMD. In one embodiment, establishing the connection may comprise providing a log-in mechanism to the client device, and determining whether to provide a cookie to the client device based on a user credential received from the log-in mechanism. In one embodiment, establishing the connection may also comprise providing a list of network resources to the client device useable for establishing an SSL/VPN tunnel through an SSL/VPN gateway to at least one of the network resources. In any case, in one embodiment, the user may be validated for accessing a network, a SSL/VPN gateway, or the like. Processing then continues to block 404.

At block 404, an SSL/VPN gateway is selected to receive an HTTP request from the client device. In one embodiment, a load-balancing mechanism is employed to select the SSL/VPN gateway. A characteristic of a plurality of SSL/VPN gateways, the network traffic/connection from the client device, the client device's characteristics, a characteristic of the user of the client device, or the like may be gathered, or otherwise processed. In one embodiment, based on the characteristics and a load-balancing mechanism, the SSL/VPN gateway may be selected. Processing then continues to block 406.

At block 406, a cookie is provided to the client device, wherein the cookie is employable to persist a connection between the client device and the selected SSL/VPN gateway. The cookie may be generated by the TMD, the SSL/VPN gateway, or another component. In one embodiment, the cookie may be associated with the selected SSL/VPN gateway. In one embodiment, the cookie may indicate the selected SSL/VPN gateway, and/or include an association between the client device and the SSL/VPN gateway, permission for accessing the SSL/VPN gateway, or the like. Processing then continues to block 408.

In one embodiment, block 406 may be optional. Thus, in another embodiment, a different mechanism may be used to associate the client device with the selected SSL/VPN gateway may be used. At block 404, the client device may be determined to be authorized to connect to the SSL/VPN gateway, and processing steps to block 408 instead of performing block 406.

At block 408, the HTTPS connection between the TMD and the client device is transitioned to another non-HTTP based application protocol connection type. In one embodiment, transitioning may be performed using process 300B of FIG. 3B. In one embodiment, the transitioning may comprise establishing a tunnel between the client device and a server through the selected SSL/VPN gateway, while the underlying network session between the client device and the selected SSL/VPN gateway is maintained. The tunnel may include application tunnels, reverse proxy tunnels, network access tunnels, or the like. In one embodiment, the other application layer communication protocol connection includes a UDP, SSH, telnet, FTP, PPP based connection, or the like. In one embodiment, network traffic may be forwarded between the client device and the server, by the TMD and/or SSL/VPN gateway. In one embodiment, the network traffic may be received from the client device, along with the cookie. The received cookie may be used to determine which SSL/VPN gateways to send the network traffic to.

In one embodiment, the HTTPS connection may be terminated at the TMD, or the SSL/VPN gateway, and data within the HTTPS connection may be sent over the other application layer communication protocol connection. In one embodiment, the cookie may be read/received within the HTTPS connection after the HTTPS connection is terminated, unencrypted, or otherwise processed. In one embodiment, the data within the HTTPS connection may be re-encrypted before being sent over the other application layer communication protocol connection.

In another embodiment, the other HTTPS connection may be dropped altogether, and the client device and SSL/VPN gateway may communicate over the other application layer communication protocol connection (e.g., over a tunnel between the client device, and one of servers 108-109, through the TMD, and/or the SSL/VPN gateway). Processing then returns to a calling process for further processing.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for managing a communication over a network, comprising:
    employing Hyper-Text Transfer Protocol (HTTP) to establish a network connection between a client device and a network device, wherein an active network session is established between the client device and the network device using Transmission Control Protocol/Internet Protocol (TCP/IP);
    selecting a gateway to receive a request from the client device; and
    transitioning the HTTP connection between the network device and the client device to a non-HTTP based application protocol connection extended at least to the selected gateway and the client device in part by sending an HTTP disable command, disabling an HTTP protocol for the HTTP connection with the client device, while the underlying TCP/IP network session remains active wherein transitioning further comprises: terminating the HTTP communication at the network device; and
    sending network traffic from the terminated HTTP connection to the selected gateway.

2. The method of claim 1, further comprising:
    employing a load balancing mechanism to select the gateway to receive the request from the client device; and
    providing a cookie to the client device, wherein the cookie is employable to establish a persistent connection between the client device and the selected gateway.

3. The method of claim 1, wherein the non-HTTP based application protocol connection includes at least one of a Secure Shell (SSH), telnet, File Transfer Protocol (FTP), or Point-to-Point (PPP) based application layer protocol.

4. The method of claim 1, wherein a cookie is employed by the network device to identify the selected gateway.

5. The method of claim 1, wherein the cookie indicates an association between the client device and the SSL/VPN gateway.

6. The method of claim 1, wherein transitioning the HTTP connection further comprises the network device sending the HTTP disable command.

7. The method of claim 1, further comprising:
    providing a list of network resources to a user of the client device, wherein the user selects the non-HTTP based application protocol useable for establishing a tunnel through the selected gateway to at least one of the network resources.

8. The method of claim 1, further comprising:
    receiving network traffic from the client device, wherein the network traffic includes a cookie; and
    determining which gateway to send the network traffic to based on the received cookie.

9. A Traffic Management Device (TMD) interposed between a client device and a plurality of gateways for managing a communication over a network, comprising:
    a transceiver for communicating data over the network; and
    a processor operable to perform actions comprising:
        establishing an active network session with the client device;
        communicating with the client device over the active network session using an Hyper-Text Transfer Protocol (HTTP) application layer protocol;
        selecting a gateway from the plurality of gateways to receive a request from the client device over HTTP;
        providing a cookie to the client device, wherein the cookie is employable to establish a persistent connection between the client device and the selected gateway; and
        transitioning from HTTP application layer protocol to a non-HTTP based application protocol between the client device and the selected gateway in part by sending an HTTP disable command, disabling the HTTP application layer protocol with the client device for the active network session, while maintaining the active network session with the client device wherein transitioning further comprises: terminating the HTTP communication at the Traffic Management Device (TMD); and
        sending network traffic from the terminated HTTP connection to the selected gateway.

10. The TMD of claim 9, wherein transitioning to a non-HTTP based application protocol further comprises establishing a tunneled connection between the client device and the selected gateway.

11. The TMD of claim 9, wherein the cookie is generated by at least one of the TMD or the selected gateway.

12. The TMD of claim 9, wherein the non-HTTP based application protocol comprises at least one of a Secure Shell (SSH), telnet, File Transfer Protocol (FTP), or Point-to-Point (PPP) protocol connection.

13. The TMD of claim 9, wherein transitioning from HTTP application layer protocol further comprises the TMD receiving a transition request from the client device.

14. A system for managing a communication over a network, comprising:
  a client device operable to perform actions comprising:
    establishing an Hyper-Text Transfer Protocol Secure (HTTPS) application layer protocol connection over the network, wherein the HTTPS connection is established over an active network connection with a Traffic Management Device (TMD); and
  the TMD operable to perform actions comprising:
    establishing the active network connection with the client device with an HTTPS connection over the active network connection;
    establishing a connection with a selected gateway; and
    transitioning from the HTTPS application layer protocol to a non-HTTP based application protocol to establish a tunneled connection between the selected gateway and the client device in part by sending an HTTP disable command, disabling an HTTP application layer protocol with the client device, while maintaining the active network connection to the client device during the transition wherein transitioning further comprises: terminating the HTTP communication at the Traffic Management Device (TMD); and
    sending network traffic from the terminated HTTP connection to the selected gateway.

15. The system of claim 14, wherein the non-HTTP based application protocol comprises at least one of a Secure Shell (SSH), telnet, File Transfer Protocol (FTP), or Point-to-Point (PPP) protocol connection that is selected from a list provided to the user from the selected gateway.

16. The system of claim 14, wherein maintaining an underlying active connection to the client device during the transition further comprises not dropping the TCP/IP connection with the client device.

17. The system of claim 14, wherein the client device is further operable to perform actions comprising sending a transition request to the TMD.

18. The system of claim 14, wherein establishing a connection with the selected gateway further comprises using a cookie to persist a connection between the selected gateway and the client device.

* * * * *